Dec. 18, 1923.

M. CLARK

ROLL CUTTER

Filed July 18, 1921

1,477,693

Inventor.
Mary Clark.

By [signature]
Attorney

Patented Dec. 18, 1923.

1,477,693

UNITED STATES PATENT OFFICE.

MARY CLARK, OF GARDEN CITY, KANSAS.

ROLL CUTTER.

Application filed July 18, 1921. Serial No. 485,475.

*To all whom it may concern:*

Be it known that I, MARY CLARK, a citizen of the United States, residing at Garden City, in the county of Finney and State of Kansas, have invented a new and useful Roll Cutter, of which the following is a specification.

This invention relates to a cutter particularly designed for use in making "Parker House" rolls whereby all of the rolls will be of uniform size and appearance.

Another object is to provide a device of this character capable of cutting out and scoring a number of rolls at one operation.

A further object is to provide a device of this character which will produce rolls that will open perfectly, as when it is desired to butter them before reheating.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred forms of the invention have been shown.

In said drawings—

Referring to the figures by characters of reference 1 designates a cutting ring having upstanding lugs 2 and arranged within this ring is a straight scoring blade 3 having its lower edge spaced from the plane occupied by the bottom of the ring. This scoring knife is not arranged across the center of the ring but is located to one side of the center.

Figure 1:
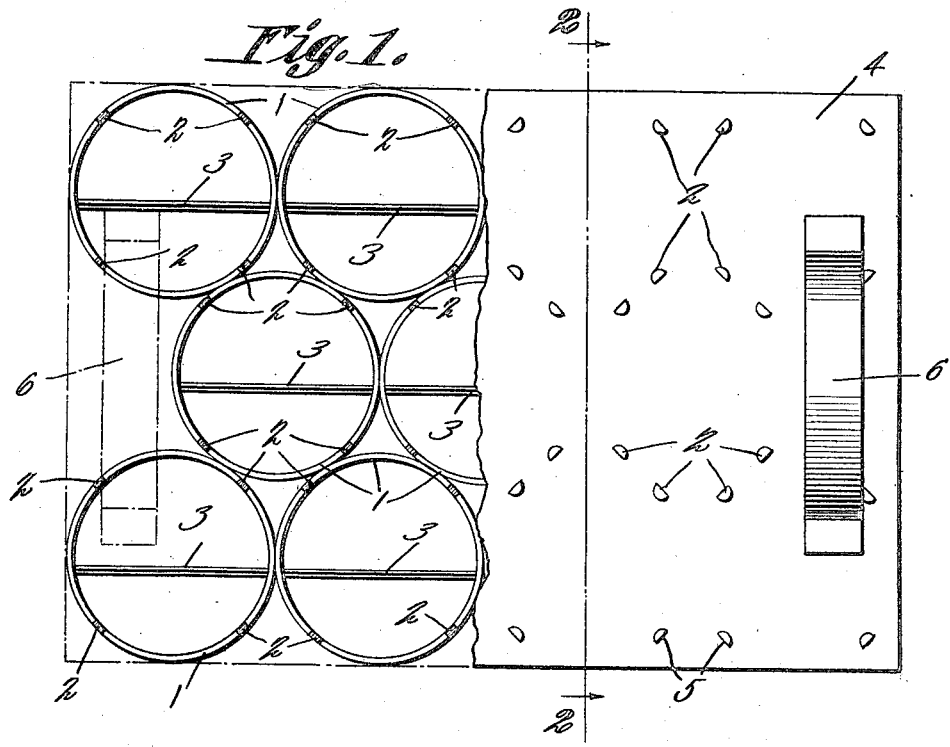
Figure 1 is a plan view of a multiple cutter, a part being broken away.
Figure 2:
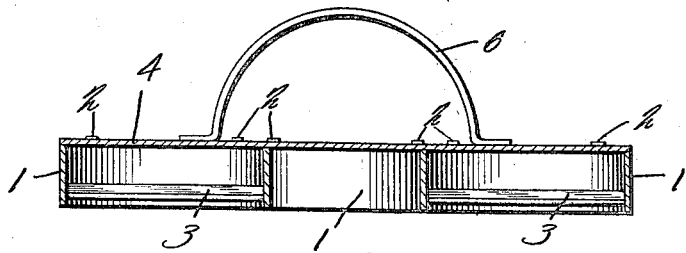
Figure 2 is a section on line 2—2 of Figure 1.

A number of the cutting rings can be grouped together as shown in Figure 1, there being a cover plate 4 resting on the rings and having openings 5 into which the lugs 2 extend. These lugs are then bent over as shown at the right of Figure 1 so as to hold the rings assembled with the plate. Handles 6 may be secured on the plate 4.

In using the device the dough is first rolled to the proper thickness. The cutter is then forced into the dough and will shape it into circular portions. The knives 3 will cut scores in the upper faces of these circular portions and after the cutter has been removed from the dough each portion can be folded along the score therein. Consequently all of the rolls thus made will be of uniform size and proportions.

Figure 3:
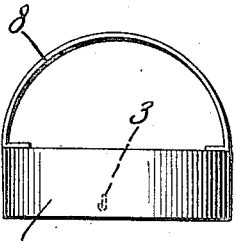
Figure 3 is an elevation of a single form of cutter.

It is of course to be understood that the number of cutting rings in a unit can be increased or diminished. In the form shown in Figure 1 eleven rings are connected to one cover plate 4. As shown in Figure 3, however, the cutter includes a single ring 7 having handle 8 thereon.

By providing a cutter such as described the rolls can be quickly shaped and by scoring the rolls by cutting thereinto with the knives 3 the rolls can be easily opened when it is desired to butter and reheat them.

What is claimed is:—

1. A cutter including a ring, a scoring knife extending across the ring at one side of the center thereof and having an edge above the plane of the bottom of the ring, and a handle, said blade being fixed relative to the ring.

2. A cutter including a plate, a cutting ring secured to the plate, a scoring knife extending across the ring at one side of the center thereof and with its edge above the plane of the bottom of the ring, and a handle upon the plate, said handle and blade being fixed relative to the ring.

3. A roll cutter including a plate, a plurality of rings thereunder, lugs upon the rings and extending through and lapping the plate, handles upon the plate, and a scoring knife extending across each ring at one side of the center thereof and having its edge above the plane of the lower edges of the rings, the handles and blades being fixed relative to the plate.

In testimony that I claim the foregoing as my own, I have hereto affixed my signature in the presence of two witnesses.

MARY CLARK.

Witnesses:
 J. D. WHITEHEAD,
 G. T. LA BERTRAM.